(12) United States Patent
Turner

(10) Patent No.: US 9,048,651 B2
(45) Date of Patent: Jun. 2, 2015

(54) LOW-PROFILE STRAIN RELIEF AND CABLE RETENTION

(71) Applicant: Bose Corporation, Framingham, MA (US)

(72) Inventor: Jonathan D. Turner, Natick, MA (US)

(73) Assignee: Bose Corporation, Framingham, MA (US)

( * ) Notice: Subject to any disclaimer, the term of this patent is extended or adjusted under 35 U.S.C. 154(b) by 179 days.

(21) Appl. No.: 13/759,250

(22) Filed: Feb. 5, 2013

(65) Prior Publication Data

US 2014/0216811 A1  Aug. 7, 2014

(51) Int. Cl.
*H01B 7/00* (2006.01)
*H02G 15/007* (2006.01)
*H01R 13/58* (2006.01)

(52) U.S. Cl.
CPC ......... *H02G 15/007* (2013.01); *H01R 13/5816* (2013.01); *H01R 13/5833* (2013.01)

(58) Field of Classification Search
CPC ............... H01R 13/5816; H01R 13/58; H01R 13/5845; H01R 13/5205; H02G 15/007
USPC .......... 174/663, 135, 650; 439/465, 455, 445, 439/470
See application file for complete search history.

(56) References Cited

U.S. PATENT DOCUMENTS

| | | | |
|---|---|---|---|
| 4,006,956 A * | 2/1977 | Allgaier ........................ | 439/455 |
| 4,527,855 A | 7/1985 | Dietrich | |
| 5,295,859 A | 3/1994 | Kawai et al. | |
| 2002/0042222 A1* | 4/2002 | Lin ................................ | 439/470 |
| 2003/0003796 A1* | 1/2003 | Zoiss ............................. | 439/455 |
| 2007/0285906 A1* | 12/2007 | Deverall et al. ............... | 361/760 |
| 2009/0156059 A1 | 6/2009 | Zhu et al. | |
| 2010/0151732 A1 | 6/2010 | Xu et al. | |
| 2011/0100708 A1* | 5/2011 | Lamprecht et al. ........... | 174/650 |
| 2012/0028496 A1 | 2/2012 | Su et al. | |
| 2012/0045933 A1* | 2/2012 | Youtsey ........................ | 439/578 |
| 2013/0189872 A1 | 7/2013 | Siahaan et al. | |

FOREIGN PATENT DOCUMENTS

CN   202111303 U   1/2012

OTHER PUBLICATIONS

International Search Report and Written Opinion dated Apr. 29, 2014 for International application No. PCT/US2014/013477.

* cited by examiner

*Primary Examiner* — Tuan T Dinh
*Assistant Examiner* — Steven T Sawyer

(57) ABSTRACT

A strain relief and cable retention assembly for retaining a cable to a casing includes an anchor made of a flexible material. An internal bore along an axis of the anchor is sized to fit an outer jacket of the cable. Tabs extend away from the bore along axes perpendicular to the axis of the bore. A plate made of a stiff material extends along the tabs of the anchor. A section of the anchor passes through the plate such that the plate rests flat against the tabs between the tabs and a face of a casing. Reinforcing fibers from the cable are tied around the plate and the tabs, distributing stress from the cable to the plate and casing.

23 Claims, 4 Drawing Sheets

LOW-PROFILE STRAIN RELIEF AND CABLE RETENTION

BACKGROUND

This disclosure relates to a low-profile strain relief and cable retention feature for an electronic device.

When cables containing electrical or optical conductors are joined to other structures, such as an electronics casing, a feature known as a strain relief is often used at the joint between the cable and the other structure to prevent forces on the cable from causing damage to the conductors or electronics at the site of the joint. For example, sharp bends of the cable may tend to break the conductors with in the cable. A strain relief consisting of a short tube, slightly stiffer than the cable, conforming to the cable, and covering the cable from just inside the casing to a short distance beyond the casing may prevent the cable from being sharply bent at the site of the joint. Strain relief features may also be found at the ends of cables terminating in connectors, rather than in devices.

A related feature is cable retention. Cable retention is a mechanism to join the cable to the casing so that it cannot be pulled out, at least for forces within a targeted range. Cable retention can also protect the conductors in the cable, by making sure that forces on the cable are applied only to the structural elements of the cable and to the device casing, not to the conductors themselves.

Strain relief and cable retention features tend to add bulk to cables or the devices they are coupled to. Common strain relief and cable retention feature tend to extend the length or thickness of the cable or the case, beyond what would be required by the electrical or optical connections alone. [For EP purposes, consider identifying the prior art reference that you consider to be the relatively closest to the invention; don't say it is the closest; just identify it and then copy and paste the abstract, possibly fixing wording. Consider disclosing the invention as a solution to a technical problem, typically the problem not overcome by the above-identified closest prior art]

SUMMARY

In general, in one aspect, a strain relief and cable retention assembly for retaining a cable to a casing includes an anchor made of a flexible material and including a tube section and an oblong planar section at one end of the tube section. The anchor has an internal bore along an axis of the tube, ending in a hole in the planar section, and sized to fit an outer jacket of the cable. The planar section includes first and second tabs extending away from the tube section along second and third axes perpendicular to the axis of the tube, the tabs occupying a plane perpendicular to the axis of the tube. The strain relief and cable retention apparatus also includes a plate made of a stiff material generally matching the shape of the planar section of the anchor and extending along the two tabs of the planar section of the anchor. The tube section of the anchor passes through a central hole in the plate such that the plate rests flat against the planar section of the anchor.

Implementations may include one or more of the following. The planar section of the anchor may have four notches, two on each of the first and second tabs, in outer edges of the tabs parallel to the corresponding second and third axes, the two notches on each tab being directly across the tab from each other, and the plate may have four notches located along an outer edge of the plate such that the notches in the plate correspond to the notches on the planar section of the anchor. The second and third axes may be coincident, the two tabs of the planar section of the anchor extending away from each other 180° apart in the plane perpendicular to the axis of the tube. The tube section may include an intermediate section adjacent to the planar section and having an outer diameter matching the diameter of the central hole of the plate, and a primary section extending away from the planar section beyond the intermediate section. The primary section of the tube may be tapered along its length, and may have an outer diameter larger than the central hole of the plate at the end of the primary section adjacent to the intermediate section, the outer diameter decreasing along the length of the primary section away from the planar section.

In general, in one aspect, a device includes a cable having a plurality of conductors and a reinforcing layer contained within an outer jacket, a casing containing electronics electrically or optically coupled to the conductors of the cable, the casing receiving the cable through a hole in a face of the casing, an anchor made of a flexible material and comprising a tube section passing through the hole in the face of the casing and an oblong planar section at a first end of the tube section inside the casing, the cable passing through an internal bore along an axis of the tube section and ending in a hole in the planar section, the bore sized to fit the outer jacket of the cable, and the planar section comprising first and second tabs extending away from the tube section along second and third axes perpendicular to the axis of the tube, the tabs occupying a plane perpendicular to the axis of the tube and parallel to the face of the casing, and a plate made of a stiff material and generally matching the shape of the planar section of the anchor and extending along the two tabs of the planar section of the anchor, the tube section of the anchor passing through a central hole in the plate such that the plate rests flat against the planar section of the anchor between the planar section of the anchor and the face of the casing. The reinforcing layer of the cable includes fibers, which are split into at least two bundles inside the casing, each of the two bundles being tied in knots around one or the other of the tabs of the planar section of the anchor and the plate, such that external strain applied to the cable may be transferred to the plate via the reinforcing fibers.

Implementations may include one or more of the following. Glue may cover the knots in the reinforcing layer. The fibers of the reinforcing layer may include aramid fibers. The casing may be generally flat, having a length and a width each significantly greater than its thickness, and the thickness of the casing may be less than 3.5 mm greater than the outer diameter of the cable. The casing may be generally flat, having a length and a width each significantly greater than its thickness, and the total thickness of the casing may be less than 6 mm. The tube section at the hole in the casing may be 0.3 mm thick between the bore through the tube and the outer diameter of the tube, the width of the plate may be 1.0 mm greater than the outer diameter of the tube section, and the outer thickness of the casing may be 1.6 mm greater than the width of the plate. The casing may be generally flat, having a length and a width each significantly greater than its thickness, and the thickness of the casing may be determined by the electronics within the casing.

The plate may have four notches located along an outer edge of the plate, the notches located in two pairs directly across a long axis of the plate from each other, with the knots tied around the plate at the notches, such that knots are narrower than the width of the plate away from the notches, and the knots are not free to slide along the length of the plate. The planar section of the anchor also may have four notches, two on each of the first and second tabs, in outer edges of the tabs parallel to the corresponding second and third axes, such that the notches in the planar section of the anchor correspond to the notches on the plate. The second and third axes may be coincident, the two tabs of the planar section of the anchor extending away from each other 180° apart in the plane perpendicular to the axis of the tube. The tube may include an intermediate section adjacent to the planar section and having an outer diameter matching the diameter of the hole in the face of the casing, and a primary section extending away from the face of the casing. The primary section of the tube may be tapered along its length, and may have an outer diameter larger than the hole in the casing at the end of the primary section adjacent to the intermediate section, the outer diameter decreasing along the length of the primary section away from the face of the casing.

A second cable having a second plurality of conductors and a second reinforcing layer contained within a second outer jacket may be included, the casing receiving the second cable through a second hole in a second face of the casing. A second anchor with a tube section and a planar section may be included, the second cable passing through a second internal bore sized to fit the second outer jacket, the second anchor otherwise corresponding to the first anchor, with two tabs of the planar section of the second anchor parallel to the second face of the casing. A second plate corresponds to the first plate, the tube section of the second anchor passing through a central hole in the second plate, such that the second plate rests flat against the planar section of the second anchor, between the planar section of the second anchor and the second face of the casing. The second reinforcing layer of the cable may be split into bundles and tied around the second anchor and second plate in the same manner as the first reinforcing layer. The second plurality of conductors may be a different number of conductors than the first plurality of conductors. At least some of the conductors in the first cable may be coupled to electroacoustic transducers, and the conductors in the second cable may be coupled to an audio input jack. The electronics may include an active noise cancellation circuit, and at least some of the conductors in the cable may be coupled to electro-acoustic transducers.

Advantages include providing a strain relief and cable retention feature that is wide and shallow, rather than long and thick, allowing secure retention of the cable without making the associated electronics casing larger, longer, or thicker. Tension from pulling on the cable is transmitted into the mechanical structure of the casing without placing strain on the conductors, solder joints, or circuit board to which the conductors are connected.

All examples and features mentioned above can be combined in any technically possible way. Other features and advantages will be apparent from the description and the claims.

DESCRIPTION

Figure 1:
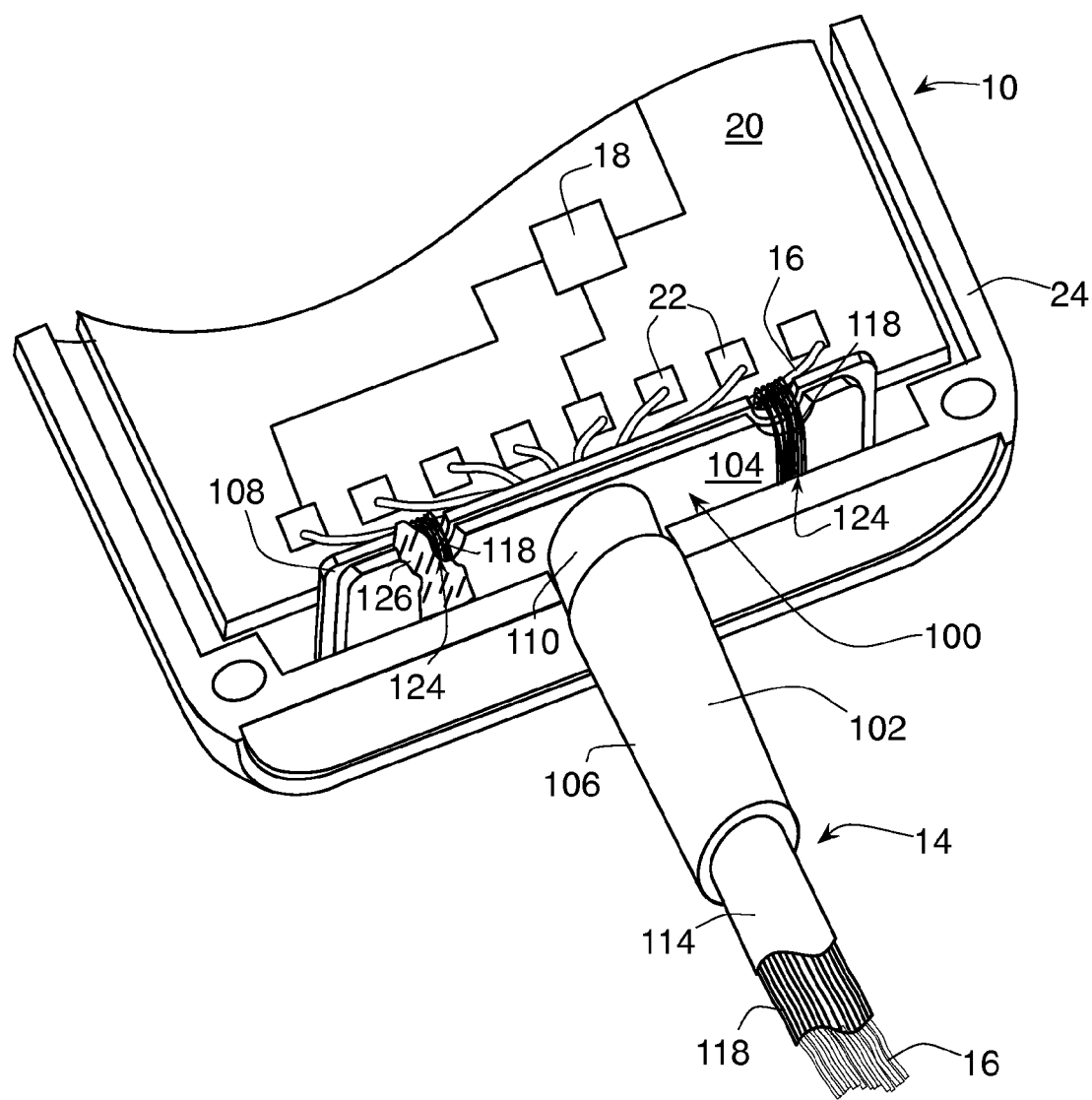
FIG. 1 shows a perspective view of a strain relief and cable retention feature joining a cable to a casing.
Figure 2:
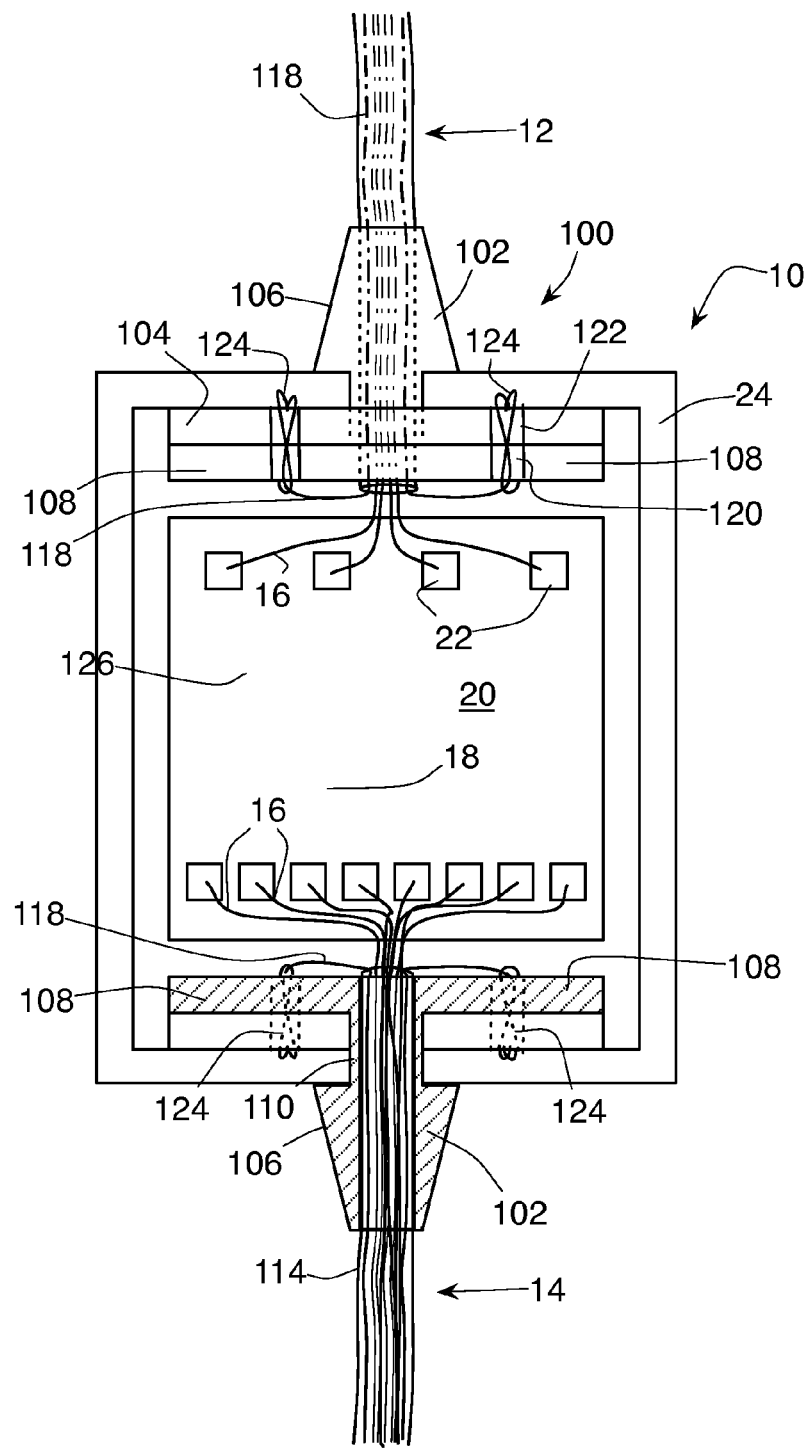
FIG. 2 shows a schematic plan view of the strain relief and cable retention feature of claim 1.

In some electronic devices, it is common to have cables with a large number of conductors attached to a metal or plastic casing containing associated electronics. In one particular example, as shown partially in FIG. 1 and schematically in FIG. 2, a control module 10 for active noise reducing headphones has two cables 12 and 14 connected to it (FIG. 1 only showing one cable 14 and one end of the control module 10). In the example of FIGS. 1 and 2, one cable 12 has four conductors 16 coming from a jack for connecting to an audio source (not shown) and the other cable 14 has sixteen conductors 16 for connecting to additional electronics in the headphones (not shown), such as electro-acoustic transducers and control switches. Similar constructions are used in many other applications. In some examples, some or all of the conductors are optical, rather than electrical, such as for providing high-speed communications.

For an electrical implementation, the conductors 16 are soldered to pads 22 on a printed circuit board (PCB) 20 (only eight of the conductors from the second cable 14 are shown in the figures, with the other eight being arranged similarly on the far side of the circuit board 20). The pads 22 are wired within the PCB to additional electronic components 18. Optical conductors would be similarly coupled to optical transceiver devices and then other electronic components on the printed circuit board. To prevent forces pulling on the cables 12 and 14 from damaging or dislodging the conductors 16, a strain relief assembly 100 is provided at each end of the control module. In FIG. 2, the strain relief assembly is shown externally at the top end of the figure, with internal features shown in dotted line. The strain relief is shown in cross-section at the bottom end of FIG. 1.

The strain relief assembly 100 includes two main elements, an anchor 102 and a plate 104. The anchor is made of a flexible material, such as TPE or natural rubber, having a hardness of between 60 to 75 Shore A. The plate 104 is made of a rigid material, such as metal or structural plastic. The plate 104 is retained in the end of the control module 10 by the casing 24 of the control module. The casing 24 is also normally made of a rigid material, which may be the same material type as the plate or a different material type. In some examples, the plate 104 is metal and the casing 24 is structural plastic. Additional retention features, such as grooves or tabs, not shown, may position and help retain the plate and anchor at the end of the casing. FIG. 1 shows only one end of a bottom half of the casing 24—a matching top half, not shown, encloses the circuit board and the strain relief assembly to complete the control module. The other end is constructed similarly to the end shown, as indicated by the schematic view in FIG. 2.

Figure 3:
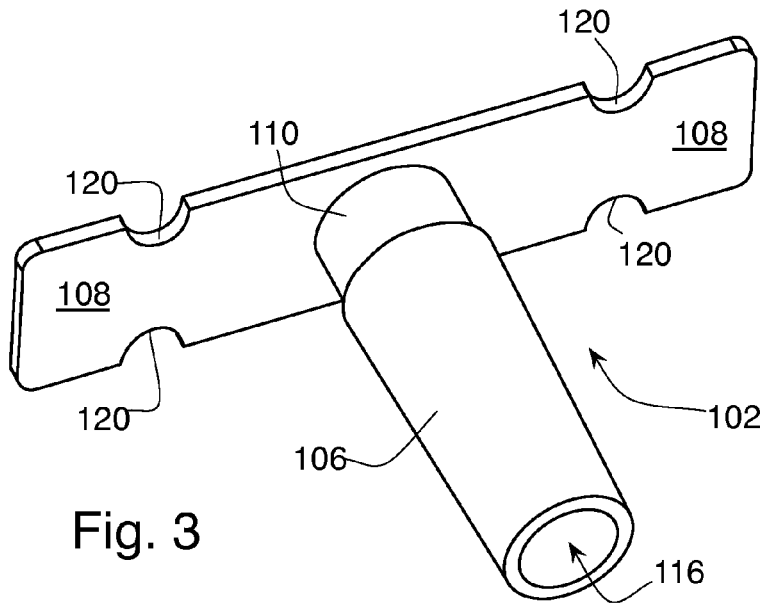
FIG. 3 shows a perspective view of an anchor component of the strain relief and cable retention feature of claim 1.
Figure 4:
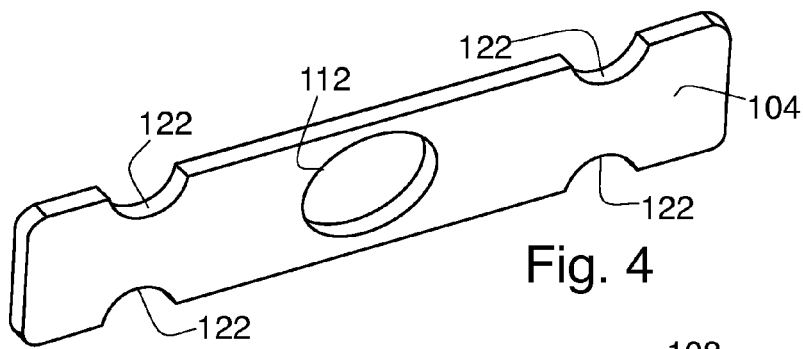
FIG. 4 shows a perspective view of a plate component of the strain relief and cable retention feature of claim 1.
Figure 5:
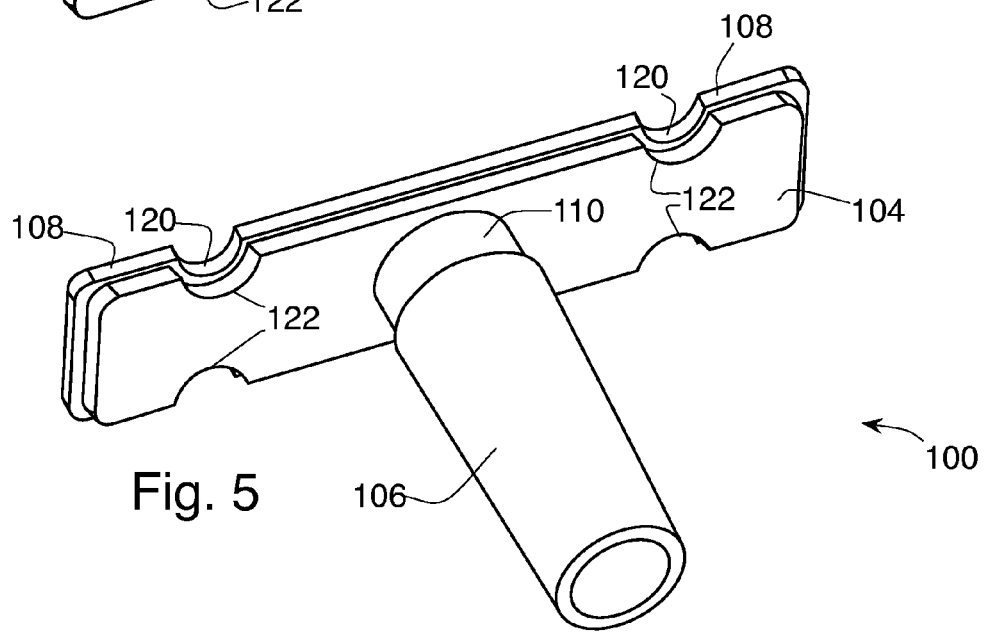
FIG. 5 shows a plan view of the anchor of FIG. 3 assembled of the plate of FIG. 4.

The anchor 102 and plate 104 are shown in more detail individually in FIGS. 3 and 4, respectively, and the strain relief assembly 100 without the casing or cable is shown in FIG. 5. The anchor 102 has two regions, a tube 106 that projects out of the casing and surrounds the end of the cable 12 or 14, and wings 108 conforming to the inside face of the metal plate 104. The tube 106 increases the stiffness of the cable/anchor assembly just before the entrance to the casing 10, preventing any sideways forces on the cable from bending the cable at the joint so far that the conductors might be broken. An intermediate section 110 of the tube is narrowed to pass through a hole 112 in the plate 104 and a corresponding hole in the casing 10 (see FIG. 1), joining the external part of tube 106 to the wings 108. As shown in FIG. 2, the cable 12 or 14 extends through tube 106, including the intermediate section 110, with the jacket 114 of the cable ending at or just beyond the end of the bore 116 of the tube 106 in the anchor between the wings 108, and the conductors continuing on to join with electronics 18 inside the casing.

Returning to FIGS. 1 and 2, the cables 12 and 14 contain a reinforcing layer 118, in addition to the conductors, shields, and insulators. In some examples, the reinforcing layer is made of Kevlar® aramid fibers made by DuPont. Other materials suitable for providing tensile strength in the cable may also be used, including, for example, silk, wire, or nylon. Typically, the strength is specified for the cable as a whole, such as 1200 PSI minimum strength with 300% tolerated elongation. In addition to the tensile strength of the conductors and insulators, reinforcing fibers will be used to achieve the target values. To help retain the cable and distribute any strain, the threads of the reinforcing layer 118 that emerge from the cable past the anchor are divided to either side of the opening 116 and tied around the wings 108 and plate 104. Notches 120, 122 in the wings 108 and plate 104 provide an anchor site for the reinforcing threads to be tied, so that the knots 124 do not slide back towards the opening in the casing 110 if the cable is pulled on from the outside. Glue 126 (shown partially cut away on one of the knots in FIG. 1) is applied to the knots 124, further fixing the reinforcing threads 118 to the plate 104.

As assembled, forces pulling either cable 12 or 14 away from the control module 10 are transferred by the reinforcing threads 118 to the plate 104 and from there to the control module itself, rather than to the conductors or, through the conductors, to the electronics (PCB 20 or individual electronics 18) within the control module. This serves to retain the cable in the control module and dissipate the stress in the cable without stressing the conductors or electronics.

Figure 6:
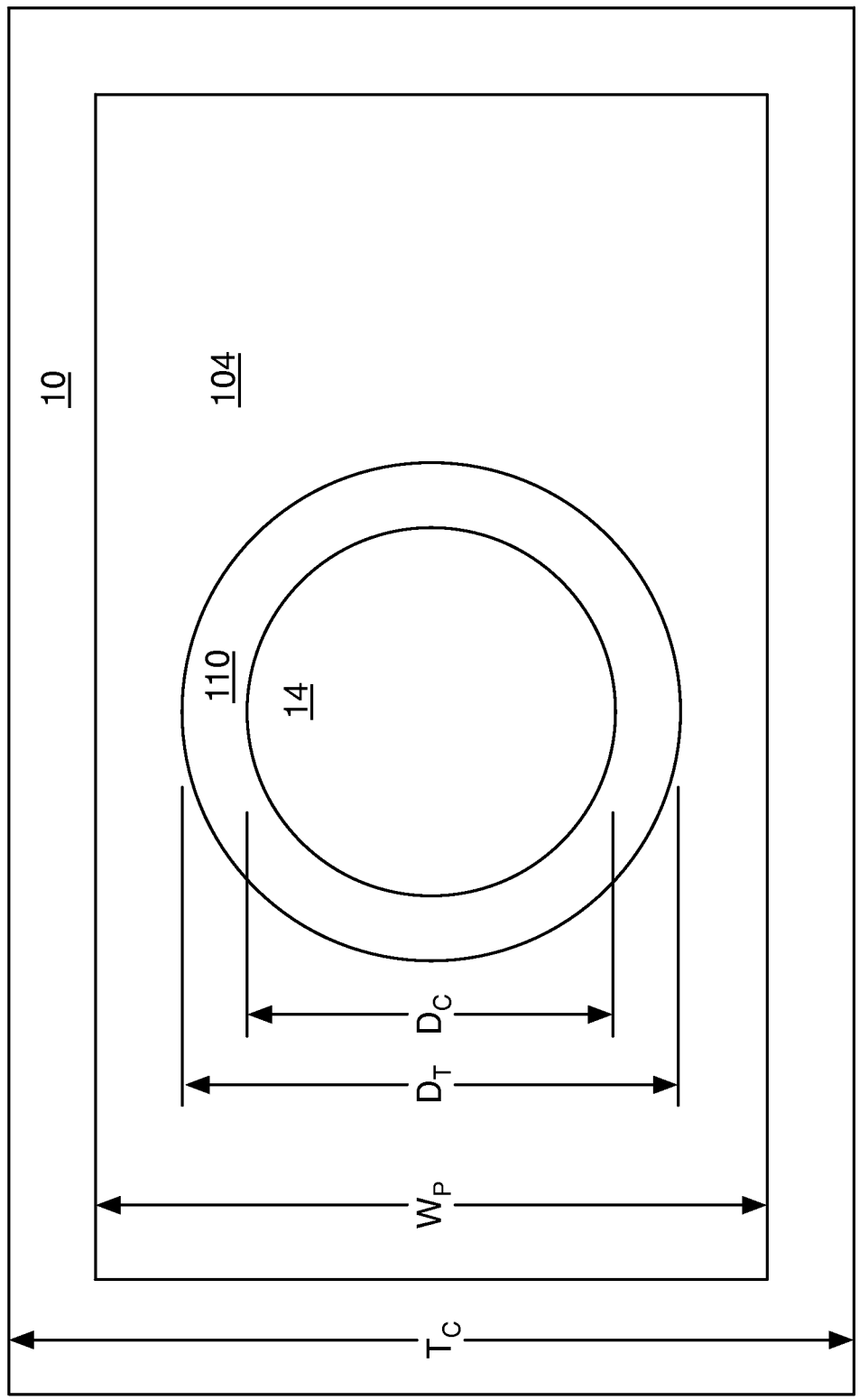
FIG. 6 shows a schematic end view of the strain relief and cable retention feature in the casing of claim 1.

The printed circuit board 20 may extend directly to the wings 108 of the anchor 102, allowing the conductors to be connected to the circuit board directly at the end of the cable. Because the plate 104, with the reinforcing fibers 118 tied to it, provides the strain relief and cable retention just inside the outer surface of the casing, it does not require any significant increase in the length of the casing, allowing the case to be as small as possible, limited only by the size of the electronics contained within. By distributing the load to the sides, the strain relief 100 also avoids increasing the height of the casing beyond that required by the electronics. FIG. 6 shows the stack-up of minimum added thickness from each component. As shown, the intermediate section of the tube 106 can be very thin, independently of the thickness of the cable 14. For some materials, such as TPE, the tube may be as as little as 0.3 mm thick, making the tube diameter $D_T$ 0.6 mm greater than the cable diameter $D_C$. The plate likewise only needs to be a small amount wider than hole through it that accommodates the tube, in some cases extending as little as 0.5 mm past the edge of the tube, making the plate width $W_P$ 1.0 mm wider than the tube diameter $D_T$. Finally, the casing can be in contact with the plate on top and bottom, in some examples with grooves in the wall of the casing to accommodate the plate. In some examples, the casing material is 0.8 mm thick, making the casing thickness $T_C$ only 1.6 mm greater than the plate width $W_P$. In total, the casing may be as little 3.2 mm thicker than the cable, i.e., $T_C=1.6+1.0+0.6+D_C=D_C+3.2$ mm. For a cable diameter of 2.7 mm as in some examples, this means that the total casing may be as little as 5.9 mm thick, barely twice the thickness of the cable. In some examples, the electronics 18 require a greater thickness inside the casing 10 than the cable and its strain relief assembly 100.

A number of implementations have been described. Nevertheless, it will be understood that additional modifications may be made without departing from the scope of the inventive concepts described herein, and, accordingly, other embodiments are within the scope of the following claims.

What is claimed is:

1. A strain relief and cable retention apparatus for retaining a cable to a casing, the apparatus comprising:
   an anchor made of a flexible material and comprising a tube section and an oblong planar section at one end of the tube section,
      the anchor having an internal bore along an axis of the tube and ending in a hole in the planar section, the bore sized to fit an outer jacket of the cable, and
      the planar section comprising first and second wings extending away from the tube section along second and third axes perpendicular to the axis of the tube, the wings occupying a plane perpendicular to the axis of the tube; and
   a plate made of a stiff material and generally matching the shape of the planar section of the anchor and extending along the two wings of the planar section of the anchor; wherein
   the tube section of the anchor passes through a central hole in the plate such that the plate rests flat against the planar section of the anchor,
   the planar section of the anchor has four notches, two on each of the first and second wings, in outer edges of the wings parallel to the corresponding second and third axes, the two notches on each wing being directly across the wing from each other, and
   the plate has four notches located along an outer edge of the plate such that the notches in the plate correspond to the notches on the planar section of the anchor.

2. The apparatus of claim 1 wherein the second and third axes are coincident, the two wings of the planar section of the anchor extending away from each other 180° apart in the plane perpendicular to the axis of the tube.

3. The apparatus of claim 1 wherein the tube section includes an intermediate section adjacent to the planar section and having an outer diameter matching the diameter of the central hole of the plate, and a primary section extending away from the planar section beyond the intermediate section.

4. The apparatus of claim 3 wherein the primary section of the tube is tapered along its length, and has an outer diameter larger than the central hole of the plate at the end of the primary section adjacent to the intermediate section, the outer diameter decreasing along the length of the primary section away from the planar section.

5. An apparatus comprising:
   a cable having a plurality of conductors and a reinforcing layer contained within an outer jacket;
   a casing containing electronics electrically or optically coupled to the conductors of the cable, the casing receiving the cable through a hole in a face of the casing;
   an anchor made of a flexible material and comprising a tube section passing through the hole in the face of the casing and an oblong planar section at a first end of the tube section inside the casing,
      the cable passing through an internal bore along an axis of the tube section and ending in a hole in the planar section, the bore sized to fit the outer jacket of the cable, and
      the planar section comprising first and second wings extending away from the tube section along second and third axes perpendicular to the axis of the tube, the wings occupying a plane perpendicular to the axis of the tube and parallel to the face of the casing; and a plate made of a stiff material and generally matching the shape of the planar section of the anchor and extending along the two wings of the planar section of the anchor;

the tube section of the anchor passing through a central hole in the plate such that the plate rests flat against the planar section of the anchor between the planar section of the anchor and the face of the casing, the reinforcing layer of the cable comprising fibers, the fibers being split into at least two bundles inside the casing, each of the two bundles being tied in knots around one or the other of the wings of the planar section of the anchor and the plate, such that external strain applied to the cable is transferred to the plate via the reinforcing fibers.

6. The apparatus of claim 5, further comprising glue covering the knots in the reinforcing layer.

7. The apparatus of claim 5, wherein the fibers of the reinforcing layer comprise aramid fibers.

8. The apparatus of claim 5, wherein the casing is generally flat, having a length and a width each significantly greater than its thickness, and the thickness of the casing is less than 3.5 mm greater than the outer diameter of the cable.

9. The apparatus of claim 5, wherein the casing is generally flat, having a length and a width each significantly greater than its thickness, and the total thickness of the casing is less than 6 mm.

10. The apparatus of claim 5, wherein the tube section at the hole in the casing is 0.3 mm thick between the bore through the tube and the outer diameter of the tube, the width of the plate is 1.0 mm greater than the outer diameter of the tube section, and the outer thickness of the casing is 1.6 mm greater than the width of the plate.

11. The apparatus of claim 5, wherein the casing is generally flat, having a length and a width each significantly greater than its thickness, and the thickness of the casing is determined by the electronics within the casing.

12. The apparatus of claim 5, wherein the plate has four notches located along an outer edge of the plate, the notches located in two pairs directly across a long axis of the plate from each other, and the knots are tied around the plate at the notches, such that knots are narrower than the width of the plate away from the notches, and the knots are not free to slide along the length of the plate.

13. The apparatus of claim 12, wherein the planar section of the anchor also has four notches, two on each of the first and second wings, in outer edges of the wings parallel to the corresponding second and third axes, such that the notches in the planar section of the anchor correspond to the notches on the plate.

14. The apparatus of claim 5, wherein the second and third axes are coincident, the two wings of the planar section of the anchor extending away from each other 180° apart in the plane perpendicular to the axis of the tube.

15. The apparatus of claim 5, wherein the tube includes an intermediate section adjacent to the planar section and having an outer diameter matching the diameter of the hole in the face of the casing, and a primary section extending away from the face of the casing.

16. The apparatus of claim 5, further comprising:

a second cable having a second plurality of conductors and a second reinforcing layer contained within a second outer jacket, the casing receiving the second cable through a second hole in a second face of the casing;

a second anchor with a tube section and a planar section, the second cable passing through a second internal bore sized to fit the second outer jacket, the second anchor otherwise corresponding to the first anchor, with two wings of the planar section of the second anchor parallel to the second face of the casing;

a second plate corresponding to the first plate, the tube section of the second anchor passing through a central hole in the second plate, such that the second plate rests flat against the planar section of the second anchor, between the planar section of the second anchor and the second face of the casing;

the second reinforcing layer of the cable split into bundles and tied around the second anchor and second plate in the same manner as the first reinforcing layer.

17. The apparatus of claim 5, wherein the electronics comprise an active noise cancellation circuit, and at least some of the conductors in the cable are coupled to electro-acoustic transducers.

18. The apparatus of claim 15, wherein the primary section of the tube is tapered along its length, and has an outer diameter larger than the hole in the casing at the end of the primary section adjacent to the intermediate section, the outer diameter decreasing along the length of the primary section away from the face of the casing.

19. The apparatus of claim 16, wherein the second plurality of conductors is a different number of conductors than the first plurality of conductors.

20. The apparatus of claim 16, wherein at least some of the conductors in the first cable are coupled to electroacoustic transducers, and the conductors in the second cable are coupled to an audio input jack.

21. A strain relief and cable retention apparatus for retaining a cable to a casing, the apparatus comprising:

an anchor made of a flexible material and comprising a tube section and an oblong planar section at one end of the tube section, the anchor having an internal bore along an axis of the tube and ending in a hole in the planar section, the bore sized to fit an outer jacket of the cable, and the planar section comprising first and second wings extending away from the tube section along second and third axes perpendicular to the axis of the tube, the wings occupying a plane perpendicular to the axis of the tube; and a plate made of a stiff material and generally matching the shape of the planar section of the anchor and extending along the two wings of the planar section of the anchor; wherein the tube section of the anchor passes through a central hole in the plate such that the plate rests flat against the planar section of the anchor, the tube section includes an intermediate section adjacent to the planar section and having an outer diameter matching the diameter of the central hole of the plate, and a primary section extending away from the planar section beyond the intermediate section, and the primary section of the tube is tapered along its length, and has an outer diameter larger than the central hole of the plate at the end of the primary section adjacent to the intermediate section, the outer diameter decreasing along the length of the primary section away from the planar section.

22. The apparatus of claim 21 wherein the planar section of the anchor has four notches, two on each of the first and second wings, in outer edges of the wings parallel to the corresponding second and third axes, the two notches on each wing being directly across the wing from each other; and the plate has four notches located along an outer edge of the plate such that the notches in the plate correspond to the notches on the planar section of the anchor.

23. The apparatus of claim 21 wherein the second and third axes are coincident, the two wings of the planar section of the anchor extending away from each other 180° apart in the plane perpendicular to the axis of the tube.

* * * * *

UNITED STATES PATENT AND TRADEMARK OFFICE
CERTIFICATE OF CORRECTION

Page 1 of 1

PATENT NO. : 9,048,651 B2
APPLICATION NO. : 13/759250
DATED : June 2, 2015
INVENTOR(S) : Jonathan D. Turner It is certified that error appears in the above-identified patent and that said Letters Patent is hereby corrected as shown below:

In the Specification

Column 1, line number 32, delete: "[For EP purposes, consider identifying the prior art reference that you consider to be the relatively closest to the invention; don't say it is the closest; just identify it and then copy and paste the abstract, possibly fixing wording. Consider disclosing the invention as a solution to a technical problem, typically the problem not overcome by the above-identified closest prior art]".

Signed and Sealed this
Twelfth Day of April, 2016

Michelle K. Lee
*Director of the United States Patent and Trademark Office*